(12) United States Patent
Endo (10) Patent No.: US 12,160,541 B2
(45) Date of Patent: Dec. 3, 2024

(54) SPECIAL FRAUD COUNTERMEASURE APPARATUS, SPECIAL FRAUD COUNTERMEASURE METHOD, AND SPECIAL FRAUD COUNTERMEASURE PROGRAM

(71) Applicant: Nippon Telegraph and Telephone Corporation, Tokyo (JP)

(72) Inventor: Shota Endo, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 88 days.

(21) Appl. No.: 17/908,316

(22) PCT Filed: Mar. 3, 2020

(86) PCT No.: PCT/JP2020/008917
§ 371 (c)(1),
(2) Date: Aug. 31, 2022

(87) PCT Pub. No.: WO2021/176559
PCT Pub. Date: Sep. 10, 2021

(65) Prior Publication Data
US 2023/0095897 A1    Mar. 30, 2023

(51) Int. Cl.
*H04M 3/00*    (2024.01)
*H04M 3/22*    (2006.01)

(52) U.S. Cl.
CPC ....... *H04M 3/2281* (2013.01); *H04M 3/2209* (2013.01); *H04M 3/2218* (2013.01)

(58) Field of Classification Search
CPC . H04M 3/2281; H04M 3/2209; H04M 3/2218
(Continued)

(56) References Cited

U.S. PATENT DOCUMENTS

2004/0186724 A1* 9/2004 Morin ................ G10L 17/06
704/E17.007
2006/0285665 A1* 12/2006 Wasserblat ......... G06Q 20/4016
704/E17.002
(Continued)

FOREIGN PATENT DOCUMENTS

JP    2003264857    9/2003
JP    2011135328    7/2011
(Continued)

OTHER PUBLICATIONS

[No Author Listed] [online], "Tobilaphone," Tobila Systems, Inc., retrieved on Jan. 26, 2020, retrieved from URL <https://tobilaphone.com/landline/>, 7 pages (with English Translation).

*Primary Examiner* — William J Deane, Jr.
(74) *Attorney, Agent, or Firm* — Fish & Richardson P.C.

(57) ABSTRACT

An anti-communications fraud apparatus includes: an analysis unit that analyzes a voiceprint of a communication voice of a calling party; a determination unit that acquires, from a database in which the voiceprint and a degree of fraud risk are stored in association with each other, the degree of fraud risk corresponding to the voiceprint of the calling party, and determines whether the degree of fraud risk exceeds a predetermined threshold; and a notification unit that notifies that the calling party is dangerous when the degree of fraud risk exceeds the threshold.

18 Claims, 6 Drawing Sheets

(58) Field of Classification Search
USPC .................. 379/189, 201.01, 114.14, 127.02
See application file for complete search history.

(56) References Cited

U.S. PATENT DOCUMENTS

| | | | |
|---|---|---|---|
| 2018/0218730 A1* | 8/2018 | Volkart | ............... H04M 3/2281 |
| 2020/0042723 A1* | 2/2020 | Krishnamoorthy | ..... G06F 21/45 |
| 2022/0006899 A1* | 1/2022 | Phatak | ...................... G06N 7/01 |
| 2022/0108701 A1* | 4/2022 | Gupta | ................. H04M 3/5166 |
| 2022/0392452 A1* | 12/2022 | Gupta | .................... G06F 21/32 |

FOREIGN PATENT DOCUMENTS

| | | |
|---|---|---|
| JP | 2013207394 | 10/2013 |
| JP | 2016053600 | 4/2016 |

* cited by examiner

SPECIAL FRAUD COUNTERMEASURE APPARATUS, SPECIAL FRAUD COUNTERMEASURE METHOD, AND SPECIAL FRAUD COUNTERMEASURE PROGRAM

CROSS-REFERENCE TO RELATED APPLICATIONS

This application is a National Stage application under 35 U.S.C. § 371 of International Application No. PCT/JP2020/008917, having an International Filing Date of Mar. 3, 2020. The disclosure of the prior application is considered part of the disclosure of this application, and is incorporated by reference in its entirety into this application.

TECHNICAL FIELD

The present invention relates to an anti-communications fraud apparatus, an anti-communications fraud method, and an anti-communications fraud program.

BACKGROUND ART

In recent years, the number of occurrences of communications fraud has been significantly increasing, and thus countermeasures for nuisance calls and suspicious calls on network have been demanded. As a countermeasure for communications fraud, there is a service in which a phone number of a malicious calling party is registered in a blacklist and a dedicated terminal capable of referring to the blacklist is provided in a subscriber's home, so that the subscriber is warned about an incoming call from a calling party who may be involved in communications fraud (NPL 1).

CITATION LIST

Non Patent Literature

NPL 1: TOBILA SYSTEMS, "TOBILAPHONE", [online], Internet<URL: https://tobilaphone.com/landline/>

SUMMARY OF THE INVENTION

Technical Problem

In current communications frauds, a trick of frequently changing the phone number may be used. In this case, a phone number after change may not be registered in time and a malicious person cannot be determined based on a blacklist of phone numbers of malicious calling parties.

The present invention has been made in view of the above circumstances, and an object of the present invention is to provide an anti-communications fraud apparatus, an anti-communications fraud method, and an anti-communications fraud program which are capable of determining a potentially fraudulent call even when a phone number is frequently changed.

Means for Solving the Problem

In order to achieve the above object, an aspect of the present invention includes: an analysis unit that analyzes a voiceprint of a communication voice of a calling party; a determination unit that acquires, from a database in which the voiceprint and a degree of fraud risk are stored in association with each other, the degree of fraud risk corresponding to the voiceprint of the calling party, and determines whether the degree of fraud risk exceeds a predetermined threshold; and a notification unit that notifies that the calling party is dangerous when the degree of fraud risk exceeds the threshold.

An aspect of the present invention is an anti-communications fraud method executed by an anti-communications fraud apparatus. The anti-communications fraud method includes: analyzing a voiceprint of a communication voice of a calling party; acquiring, from a database in which the voiceprint and a degree of fraud risk are stored in association with each other, the degree of fraud risk corresponding to the voiceprint of the calling party, and determining whether the degree of fraud risk exceeds a predetermined threshold; and notifying that the calling party is dangerous when the degree of fraud risk exceeds the threshold.

An aspect of the present invention is an anti-communications fraud program that causes a computer to operate as an anti-communications fraud apparatus.

Effects of the Invention

According to the present invention, it is possible to provide an anti-communications fraud apparatus, an anti-communications fraud method, and an anti-communications fraud program which are capable of determining a potentially fraudulent call even when a phone number is frequently changed.

DESCRIPTION OF EMBODIMENTS

Hereinafter, an embodiment of the present invention will be described with reference to the drawings.

Configuration of Anti-Communications Fraud System

Figure 1:
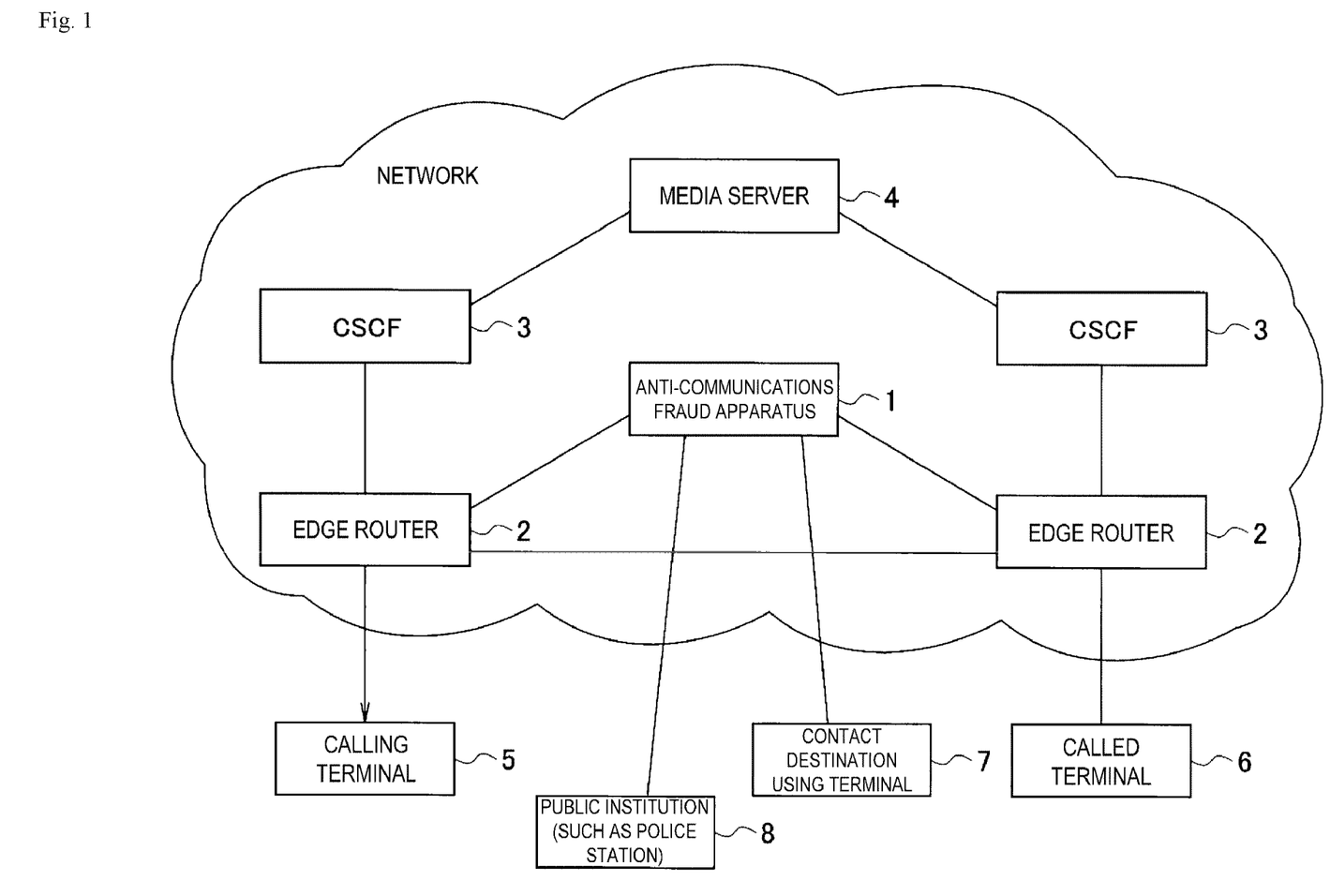
FIG. 1 is an overall configuration diagram of a network system according to an embodiment of the present invention.

FIG. 1 is an overall configuration diagram of a network system according to an embodiment of the present embodiment. The present embodiment is a technique regarding an anti-communications fraud in a network of voice communication. A system illustrated in FIG. 1 includes, in a network such as an IP multimedia subsystem (IMS) network, an anti-communications fraud apparatus 1, an edge router 2, a call session control function (CSCF) 3, and a media server 4. The edge router 2 is a subscriber service edge (SSE) or the like that accommodates a terminal 5, and transmits and receives a voice on a user plane (U-plane). The CSCF 3 is a session control server that controls a call by using an SIP.

The anti-communications fraud apparatus 1 is an apparatus that prevents communications fraud by using a voiceprint of a caller (voice feature). The anti-communications fraud apparatus 1 according to the present embodiment is connected to the edge router 2, and prevents communications fraud by using a communication voice that is a U-plane signal. The anti-communications fraud apparatus 1 will be described later.

The media server (MS) 4 is connected to the CSCF 3, transmits a voice guidance held by the anti-communications fraud apparatus 1 to a calling terminal 5 or a called terminal 6 in response to a request of the CSCF3. In the present embodiment, before a call is connected, the media server 4 transmits, to the calling terminal 5, an instruction of recording a communication voice.

The calling terminal 5 and the called terminal 6 are terminals having a telephone function. In the present embodiment, the calling terminal 5 is assumed to be a terminal used by a suspicious person or a malicious person who makes a suspicious call such as a nuisance call, a call of communications fraud, such as billing fraud, and a call to collect personal information. The called terminal 6 is assumed to be a terminal used by a user who receives a suspicious call. The user is assumed to be, for example, victims of communications fraud, older people, or other general users.

A contact destination using terminal 7 is a terminal used by a user registered by a called party as a contact destination, such as a relative of the called party. The anti-communications fraud apparatus 1 notifies the contact destination using terminal 7 that there is a suspicious call. A public institution 8 such as a police station provides information on voices of malicious persons who are involved in communications fraud to the anti-communications fraud apparatus 1.

Figure 2:
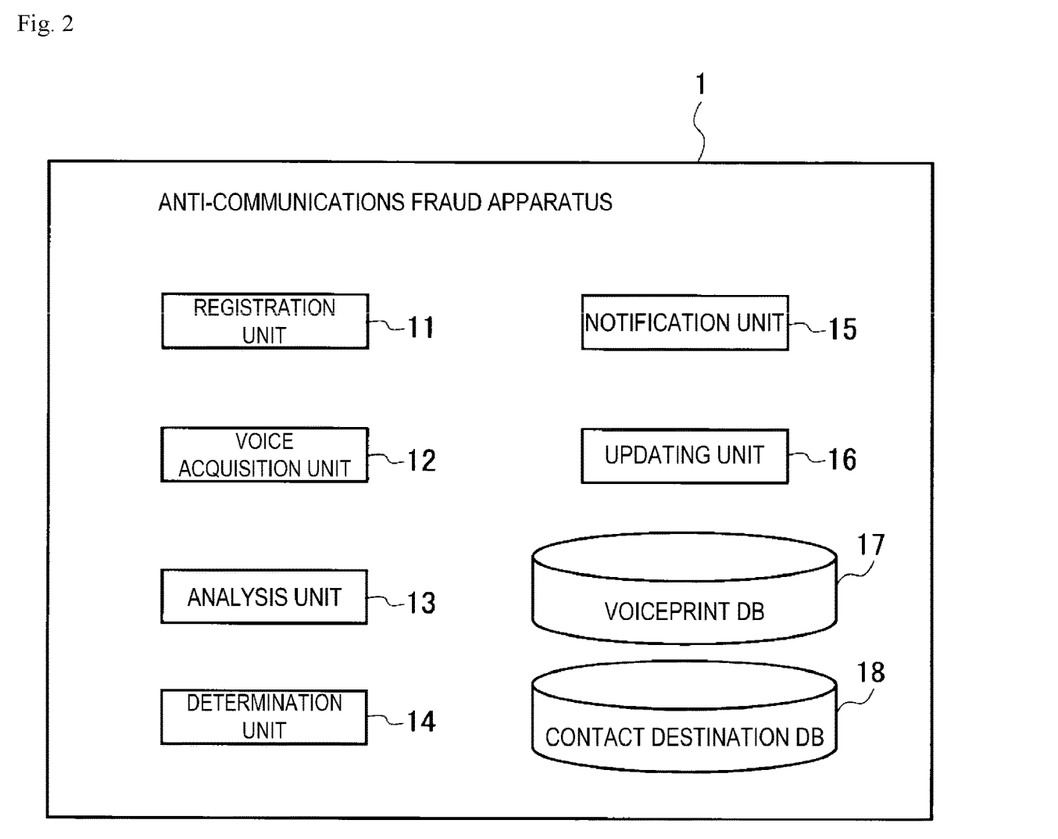
FIG. 2 is a block diagram illustrating a configuration of an anti-communications fraud apparatus.

FIG. 2 is a block diagram illustrating a configuration of the anti-communications fraud apparatus 1. The anti-communications fraud apparatus 1 includes a registration unit 11, a voice acquisition unit 12, an analysis unit 13, a determination unit 14, a notification unit 15, an updating unit 16, a voiceprint DB 17, and a contact destination DB 18.

The registration unit 11 registers a voiceprint and a degree of fraud risk (score) of the voiceprint in association with each other in the voiceprint DB 17. Specifically, the registration unit 11 acquires voices of suspicious persons, malicious persons involved in communications fraud, and registers a voiceprint of each voice and a degree of fraud risk corresponding to the voiceprint in the voiceprint DB 17, the voices being provided from the public institution 8 such as a police station or public security. The registration unit 11 transmits the voice to the analysis unit 13, and acquires, from the analysis unit 13, a voiceprint of the voice as an analysis result.

The registration unit 11 may set the highest degree of fraud risk for the voiceprints of the voices provided from the public institution 8. In addition, the registration unit 11 may set the degree of fraud risk specified by the public institution 8. The degree of fraud risk may be set, for example, in seven grades of −3, −2, −1, 0, +1, +2, and +3. −3 is the highest degree of fraud risk and +3 is the lowest degree of fraud risk (highly safe).

In addition, the registration unit 11 may register voiceprints and the degree of fraud risk of each subscriber (user) of all the terminals 5 and 6 in the voiceprint DB 17. In this case, each subscriber provides his/her voice to the anti-communications fraud apparatus 1 at the time of contract signing. The registration unit 11 registers the voiceprint of his/her voice of each subscriber and the degree of fraud risk in association with each other in the voiceprint DB 17. The registration unit 11 transmits the voice to the analysis unit 13, and acquires, from the analysis unit 13, the voiceprint of the voice as an analysis result. The registration unit 11 sets predetermined values for the voiceprint of each voice provided from the subscriber, such as the lowest degree (+3) of fraud risk and the median degree (0) of fraud risk.

The voice acquisition unit 12 acquires communication voices of a calling party and a called party from the edge router 2. The edge router 2 may transmit the communication voices to the anti-communications fraud apparatus 1 as it is by a mirror port, for example. In addition, a session border controller (SBC) may be provided between the edge router 2 and the anti-communications fraud apparatus 1, and the edge router 2 may transmit the communication voices to the anti-communications fraud apparatus 1 via the SBC.

The analysis unit 13 analyzes a voiceprint of the communication voice of the calling party. Specifically, the analysis unit 13 performs frequency analysis on the voice input from the voice acquisition unit 12 or the registration unit 11 to acquire the voiceprint (voice feature). The analysis unit 13, for example, calculates mel-frequency cepstrum coefficients (MFCC) as the voiceprint. In addition, the analysis unit 13 collates the analyzed voiceprint with a plurality of voiceprints registered in the voiceprint DB 17, and identifies a corresponding voiceprint from the voiceprint DB 17. The corresponding voiceprint is a voiceprint whose matching degree with the analyzed voiceprint is equal to or greater than a predetermined value (for example, 90% or more).

The determination unit 14 acquires, from the voiceprint DB 18 which stores a voiceprint and a degree of fraud risk in association with each other, the degree of fraud risk corresponding to the voiceprint analyzed by the analysis unit 13 to determine whether the degree of fraud risk exceeds a predetermined threshold. When the degree of fraud risk is the grades of −3 to +3, for example, the threshold is assumed to be 0. In this case, the determination unit 14 determines that the degree of fraud risk less than 0 (−3 to −1) exceeds the threshold, and determines that the degree of fraud risk equal to or greater than of 0 (0 to +3) does not exceed the threshold. The determination unit 14 determines that the calling party is involved in fraud when the degree of fraud risk exceeds the threshold, and determines that the calling party is harmless (not involved in fraud) when the degree of fraud risk does not exceed the threshold. In addition, the determination unit 14 determines that the calling party is harmless when the voiceprint DB 17 includes no voiceprint (a voiceprint with a predetermined matching degree or more) corresponding to the voiceprint of the calling party.

The notification unit 15 notifies that the calling party is dangerous (suspicious person, malicious person) when the degree of fraud risk exceeds the threshold. Specifically, after a call between the calling party and the called party is ended, the notification unit 15 may refer to the contact destination DB 18, and notify at least one of the called terminal 6 of the called party or the contact destination using terminal 7 of the called party that the calling party is dangerous, together with the degree of fraud risk. For example, the notification unit 15 uses an SMS, a mail or the like to give the notification to at least one of the called terminal 6 or the contact destination using terminal 7. In addition, the notification unit 15 may transmit a warning sound to the called terminal 6 during a call between the calling party and the called party.

The updating unit 16 receives feedback information from the called terminal 6 or the contact destination using terminal 7 of the called party, and updates the degree of fraud risk of the voiceprint of the calling party of the call specified in the feedback information. Specifically, when more than a predetermined number of pieces of feedback information is received for a voiceprint in a certain period of time, the updating unit 16 sets the degree of fraud risk of the voiceprint to −1. For example, the updating unit 16 updates the degree of fraud risk from −1 to −2.

In addition, the updating unit 16 may newly register a voiceprint which is not registered in the voiceprint DB 17, based on the feedback information. Specifically, when more than a predetermined number of pieces of feedback information is received for a voiceprint in a certain period of time, the updating unit 16 determines that the person with the voiceprint is a suspicious person and registers the voiceprint in the voiceprint DB 17. In this case, the updating unit 16 sets the degree of fraud risk of the newly registered voiceprint to a value (for example, −3 to −1) exceeding the threshold.

In addition, with respect to a voiceprint with a high degree of fraud risk in the voiceprint DB 17, the updating unit 16 lowers the degree of fraud risk when no feedback information for the voiceprint is provided for a certain period of time. For example, the updating unit 16 updates the degree of fraud risk of the voiceprint from minus (−3, −2, −1) to 0, or lowers the degree of fraud risk by adding 1 to the minus grade.

In addition, the updating unit 16 updates the degree of fraud risk in accordance with credibility of a transmitter (a called party or a user of the contact destination using terminal 7) who transmits the feedback information. The credibility is determined based on, for example, the service subscription period of the transmitter, the number of times of transmission of the feedback information. In addition, when the voiceprint and the degree of fraud risk of each subscriber of all the terminals 5 and 6 are registered in the voiceprint DB 17, the degree of fraud risk registered in the voiceprint DB 17 is used as the credibility.

The transmitter who transmits the feedback information transmits the feedback information by replying to the notification transmitted from the anti-communications fraud apparatus 1. In this case, the anti-communications fraud apparatus 1 uses information (a call ID, a calling number, a called number, a call time, or the like) specifying a call set in the notification to identify the voiceprint of a calling party, and counts the information as feedback information of the voiceprint.

In addition, the transmitter may use a web browser, an application or the like provided by the anti-communications fraud apparatus 1 to transmit the feedback information. In this case, the anti-communications fraud apparatus 1 uses information (a calling number, a called number, a call time, or the like) specifying a call set in the feedback information to identify the voiceprint of a calling party, and counts the information as feedback information of the voiceprint.

The voiceprint DB 17 stores a voiceprint and a degree of fraud risk of the voiceprint in association with each other. The contact destination DB 18 stores a phone number of a subscriber, a contact destination (a phone number, a mail address) of a high-literacy user such as a relative of the subscriber. In addition, in a case where the called terminal 6 is a terminal capable of receiving an SMS, a mail or the like, the contact destination DB 18 stores a contact destination (a mail address or the like) so that a notification after a call is delivered thereto.

Operation of Anti-Communications Fraud System

Figure 3:
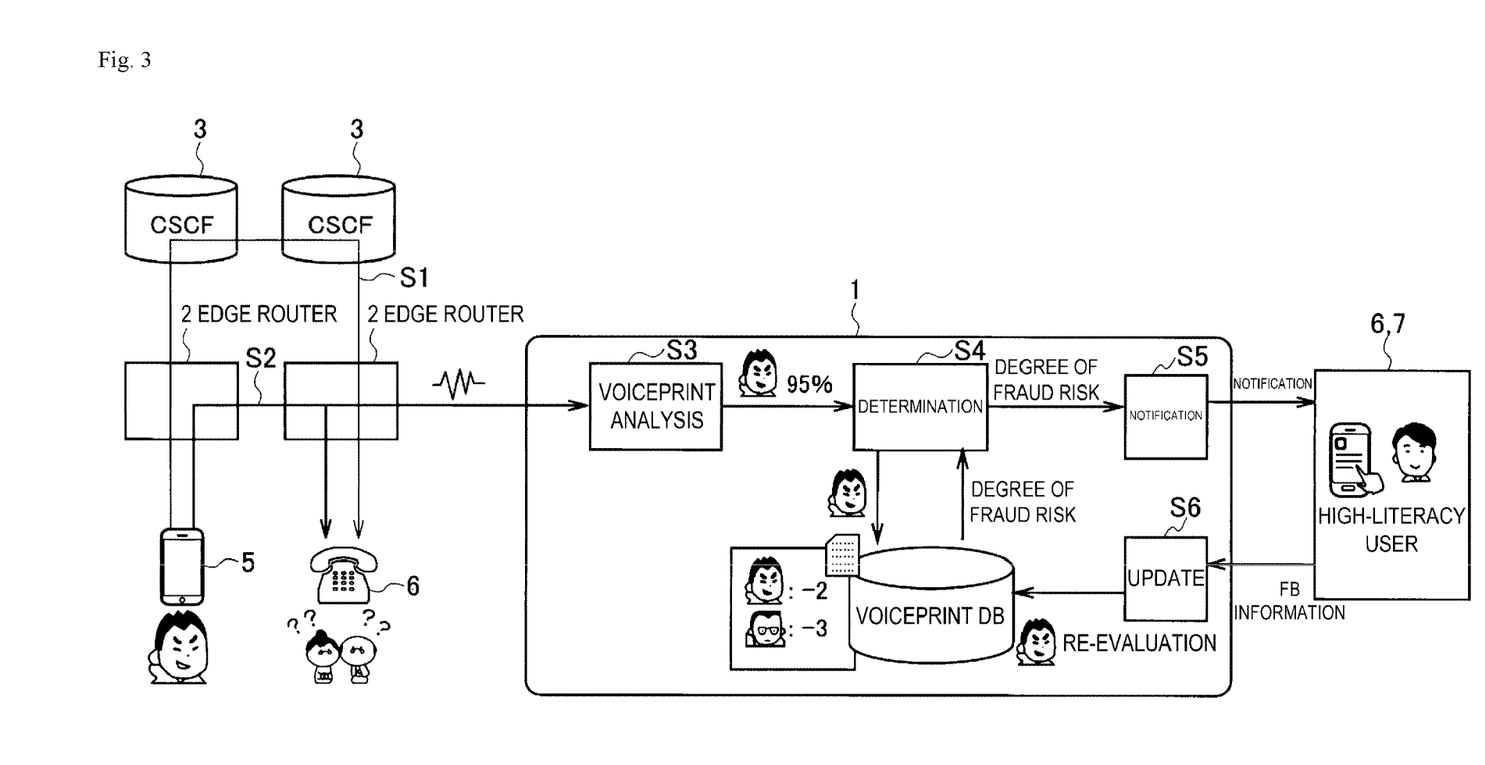
FIG. 3 is a diagram illustrating an operation outline of the anti-communications fraud apparatus.

FIG. 3 is an illustrative diagram illustrating an operation outline of the anti-communications fraud system. Here, an operation in a case where a call is received from a suspicious person will be described. The suspicious person uses the calling terminal 5 to make the call. In this manner, the call (an SIP signal) transmitted by the calling terminal 5 is connected to the called terminal 6 via the CSCF 3 (S1). When the call is connected, a communication between the calling terminal 5 and the called terminal 6 is started (S2). The anti-communications fraud apparatus 1 acquires communication voices of a calling party and a called party, analyzes a voiceprint of the voice of the calling party, and collates the voiceprint of the calling party with voiceprints stored in the voiceprint DB 17 (S3).

The anti-communications fraud apparatus 1 acquires a degree of fraud risk (score) of a voiceprint matching with the voiceprint of the calling party (here, the matching degree is 95%) from the voiceprint DB 17, and determines whether the degree of fraud risk is high (whether the degree of fraud risk exceeds the threshold) (S4). When the degree of fraud risk is high, the anti-communications fraud apparatus 1 transmits a notification including the degree of fraud risk to at least one of the called terminal 6 or the contact destination using terminal 7 by using a mail, an SMS or the like (S5). The anti-communications fraud apparatus 1 sends a notification to the contact destination using terminal 7 when the called terminal 6 is unable to receive a mail, an SMS, or the like. The anti-communications fraud apparatus 1 updates (re-evaluates) the degree of fraud risk of the voiceprint of the calling party in the voiceprint DB 17 (S6) using feedback information about suspicious calls, the feedback information being transmitted from the called terminal 6 or the contact destination using terminal 7.

Note that when the voiceprint DB 17 includes no voiceprint (a voiceprint with a predetermined matching degree or more) matching with the voiceprint of the calling party, the anti-communications fraud apparatus 1 determines that the calling party is safe, and does not transmit the notification in S5. However, based on the feedback information about a suspicious call such as communications fraud from a high-literacy user using the called terminal 6 or the contact destination using terminal 7, the anti-communications fraud apparatus 1 newly registers, in the voiceprint DB 17, the voiceprint of the calling party of the call specified by the feedback information. The degree of fraud risk in this case is set to a high risk level.

Figure 4:
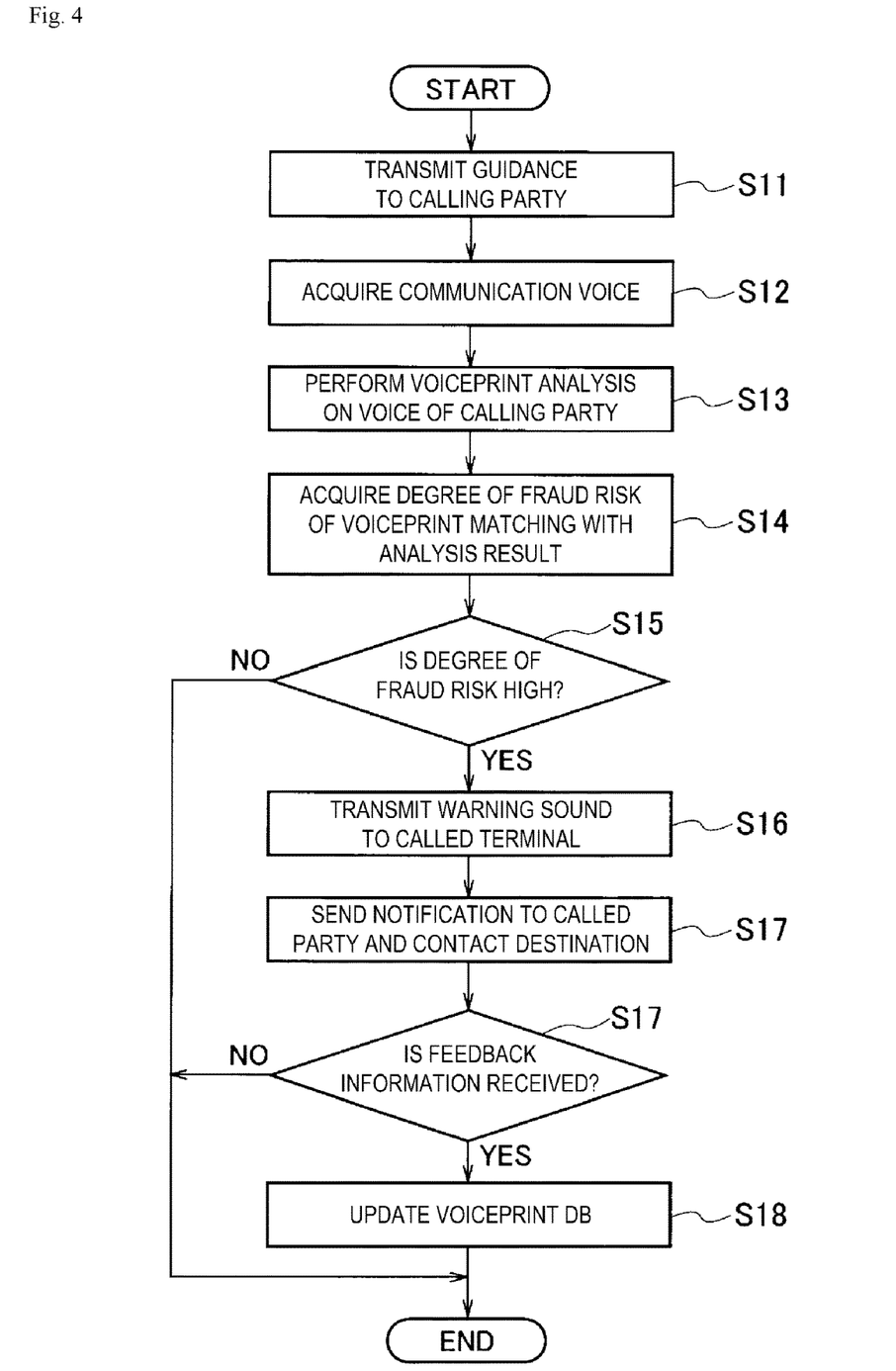
FIG. 4 is a flowchart illustrating an operation of the anti-communications fraud apparatus.

FIG. 4 is a flowchart illustrating operations of the anti-communications fraud apparatus 1 and the media server 4. Upon receiving an instruction from the CSCF 3, before a call is connected to the called terminal 6, the media server 4 transmits a guidance to the calling terminal 5 for notifying that the voice of the call is to be recorded, (S11). Then, the call is connected between the calling terminal 5 and the called terminal 6, and a talk is started. The anti-communications fraud apparatus 1 acquires communication voices of a calling party and a called party via the edge router 2 (S12).

The anti-communications fraud apparatus 1 analyzes the voice of the calling party in the acquired communication voices (S13). The anti-communications fraud apparatus 1 acquires, from the voiceprint DB 17, the degree of fraud risk of a voiceprint matching with the voiceprint of the calling party (S14). The anti-communications fraud apparatus 1 determines that the calling party is safe when the degree of fraud risk is low (when the degree of fraud risk does not exceed a predetermined threshold) (S15: NO), and ends the processing. Note that when the voiceprint DB 17 includes no voiceprint (a voiceprint with a predetermined matching degree or more) matching with the voiceprint of the calling party, the anti-communications fraud apparatus 1 determines that the calling party is safe, and ends the processing.

When the degree of fraud risk is high (when the degree of fraud risk exceeds the predetermined threshold), the anti-communications fraud apparatus 1 determines that the calling party is dangerous (S15: YES), and sends a notification to the called terminal 6 or the contact destination using terminal 7. Specifically, the anti-communications fraud apparatus 1 transmits a warning sound to the called terminal 6 during the call via the edge router 2 (S16). In addition, the anti-communications fraud apparatus 1 notifies, by SMS or e-mail, at least one of the called terminal 6 or the contact destination using terminal 7 that the calling party is dangerous after the call ends (S17).

When feedback information is received from the called terminal 6 or the contact destination using terminal 7, the anti-communications fraud apparatus 1 updates the degree of fraud risk of the voiceprint of the calling party in the voiceprint DB 17 according to the feedback information (S18).

Effects of the Present Embodiment

The anti-communications fraud apparatus according to the present embodiment described above includes: the analysis unit 13 that analyzes a voiceprint of a communication voice of a calling party; the determination unit 14 that acquires, from the voiceprint DB 17 that stores a voiceprint and a degree of fraud risk are stored in association with each other, the degree of fraud risk corresponding to the voiceprint of the calling party, and determines whether the degree of fraud risk exceeds a predetermined threshold; and the notification unit 15 that notifies that the calling party is dangerous when the degree of fraud risk exceeds the threshold.

As described above, in the present embodiment, a communication voice (voiceprint) that is biological information hard to disguise or change is used to determine a suspicious person or a malicious person, and a notification about the suspicious person or the malicious person is sent to a called party, a relative of the called party, or the like. As a result, even if a malicious calling party frequently changes his/her phone number, it is possible to identify the calling party and send the notification to the called party or the like in the present embodiment.

Figure 5:
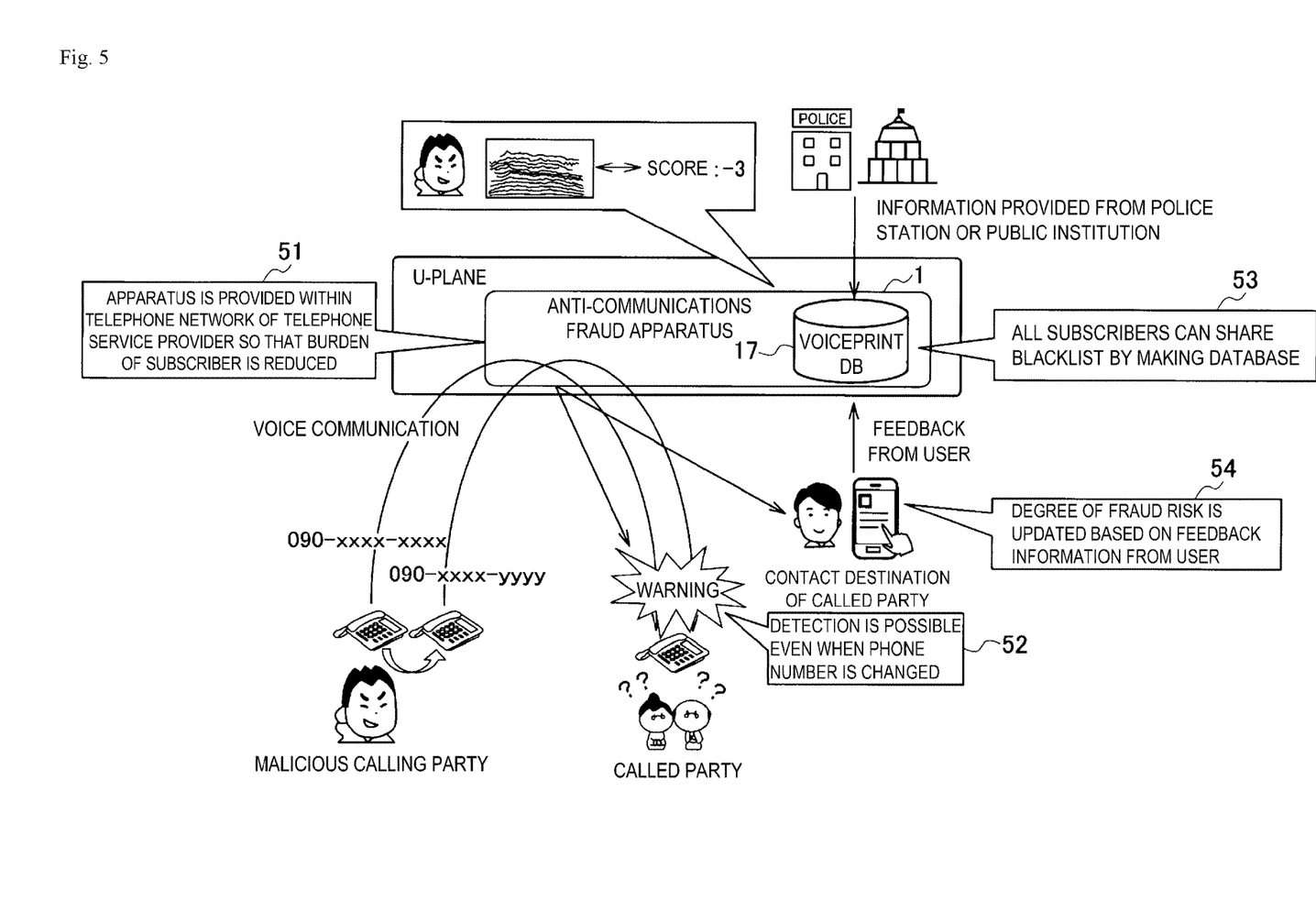
FIG. 5 is an illustrative diagram illustrating effects of the anti-communications fraud apparatus.

FIG. 5 is an illustrative diagram for illustrating effects of the present embodiment. In the present embodiment, the anti-communications fraud apparatus 1 is provided within a telephone network of a telephone service provider so that a burden of a subscriber can be reduced (51). In the present embodiment, a voice instead of a phone number is used to determine a malicious person. As a result, even when the phone number is frequently changed, it is possible to detect communications fraud (52).

In the present embodiment, voice information of malicious calling parties is received from a public institution such as a police station, and the information is compiled into a database as the voiceprint DB 17, so that all subscribers can share a blacklist (52).

In addition, in the present embodiment, the degree of fraud risk in the voiceprint DB 17 is updated according to feedback information from users (53). As a result, obsolescence of the voiceprint DB 17 can be prevented by not only using the information acquired from the public institution as it is, but also updating the degree of fraud risk in response to suspicious calls received daily. In addition, a voice of a calling party that is not included in the information provided from the public institution can be registered in the voiceprint DB 17 based on the feedback information from users, and a notification that the calling party is dangerous can be sent.

Hardware Configuration

Figure 6:
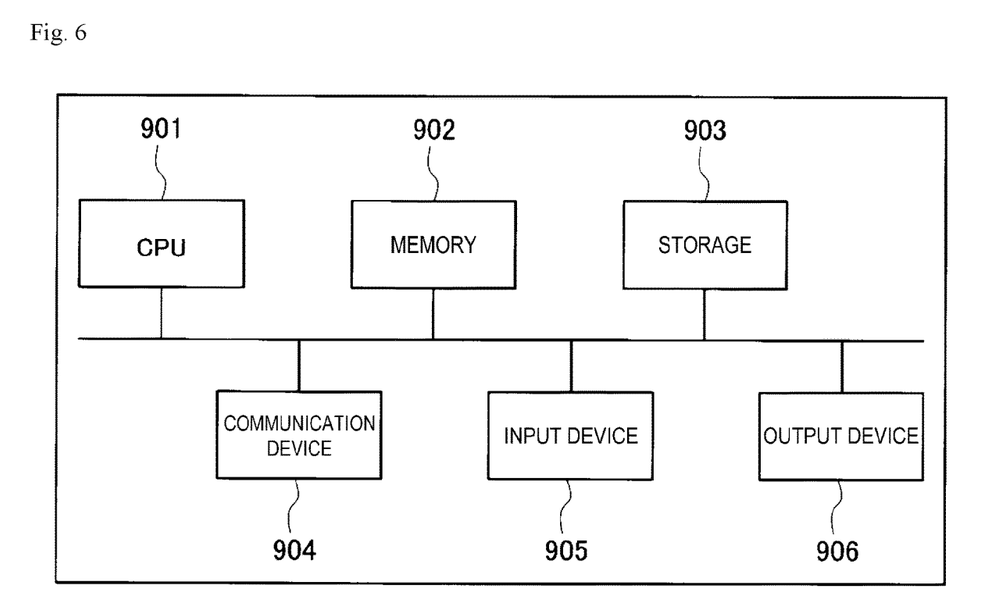
FIG. 6 is a hardware configuration example.

As the anti-communications fraud apparatus 1 described above, for example, a general-purpose computer system as illustrated in FIG. 6 can be used. The illustrated computer system includes a central processing unit (CPU, processor) 901, a memory 902, a storage 903 (hard disk drive: HDD, solid state drive: SSD), a communication device 904, an input device 905, and an output device 906. The memory 902 and the storage 903 are storage devices. In the computer system, the CPU 901 executes a predetermined program loaded in the memory 902 to implement each function of the anti-communications fraud apparatus 1.

In addition, the anti-communications fraud apparatus 1 may be implemented on one computer or may be implemented on a plurality of computers. In addition, the anti-communications fraud apparatus 1 may be a virtual machine implemented on a computer.

The program for the anti-communications fraud apparatus 1 may be stored in a computer-readable recording medium such as a HDD, a SSD, a universal serial bus (USB) memory, a compact disc (CD), or a digital versatile disc (DVD) or may be distributed via a network.

The present invention is not limited to the above-described embodiment and modifications, and various modifications may be made within the scope of the gist of the present invention.

For example, in the above-described embodiment, a case where a calling party is a malicious person is described. However, there are also communications frauds that cause users to call back. In order to take a countermeasure for such a communications fraud, the anti-communications fraud apparatus 1 performs voiceprint analysis on a communication voice of a called party. That is, the analysis unit 13 analyzes a voiceprint of the communication voice of the called party, the determination unit 14 acquires a degree of fraud risk corresponding to the voiceprint of the called party from the voiceprint DB 17 and determines whether the degree of fraud risk exceeds a threshold, and when the degree of fraud risk exceeds the threshold, the notification unit 15 notifies at least one of a calling terminal of the calling party or a contact destination using terminal of the calling party that the called party is dangerous.

In addition, it is possible to detect a communications fraud by combining a technique of registering a phone number in a blacklist and detecting a malicious person on a control plane (C-plane) and a technique of using a voice by the anti-communications fraud apparatus 1 according to the above-described embodiment.

In addition, focusing on the fact that communications frauds are carried out in groups, it is estimated that a plurality of calling parties are in the same fraud group, based on call outgoing/incoming information (a time zone for making a large number of calls, a region of calling destination) and subscriber information (for example, having a contract with the same MVNO). In order to improve detection accuracy when these fraud groups change their phone numbers, a threshold of the matching degree may be lowered for matching of the voiceprint of the calling party (or called party) presumed to be a fraud group in the voiceprint DB 17.

REFERENCE SIGNS LIST

1: Anti-communications fraud apparatus
11: Registration unit

12: Voice acquisition unit
13: Analysis unit
14: Determination unit
15: Notification unit
16: Updating unit
17: Voiceprint DB
18: Contact destination DB
2: Edge router
3: CSCF
4: Media server
5: Calling terminal
6: Called terminal
7: Contact destination using terminal
8: Public institution

The invention claimed is:

1. An anti-communications fraud apparatus, comprising:
an analysis unit, including one or more processors, configured to analyze a voiceprint of a communication voice of a calling party;
a determination unit, including one or more processors, configured to acquire, from a database in which the voiceprint and a degree of fraud risk are stored in association with each other, the degree of fraud risk corresponding to the voiceprint of the calling party, and determine whether the degree of fraud risk exceeds a threshold;
a notification unit, including one or more processors, configured to notify that the calling party is dangerous when the degree of fraud risk exceeds the threshold; and
an update unit, including one or more processors, configured to
receive, from a called party, feedback information regarding the voiceprint of the calling party, wherein the feedback information indicates that the calling party is suspicious,
determine that a predetermined number of pieces of feedback information is received for the voiceprint of the calling party in a predetermined period of time, and
raise the degree of fraud risk of the voiceprint of the calling party.

2. The anti-communications fraud apparatus according to claim 1, wherein
after a call between the calling party and the called party ends, the notification unit is configured to notify at least one of a called terminal of the called party or a contact destination using terminal of the called party that the calling party is dangerous.

3. The anti-communications fraud apparatus according to claim 1, wherein
the notification unit is configured to transmit a warning sound to a called terminal of the called party during a call between the calling party and the called party.

4. The anti-communications fraud apparatus according to claim 1, wherein
the updating unit is configured to receive the feedback information from a called terminal of the called party or a contact destination using terminal of the called party, and update the degree of fraud risk of the voiceprint of the calling party of a call, the voiceprint being specified in the feedback information.

5. The anti-communications fraud apparatus according to claim 4, wherein
the updating unit is configured to update a score of the voiceprint of the calling party based on credibility of the called party who has transmitted the feedback information or a user of the contact destination using terminal.

6. The anti-communications fraud apparatus according to claim 1, wherein
the analysis unit is configured to analyze a voiceprint of a communication voice of the called party,
the determination unit is configured to acquire a degree of fraud risk corresponding to the voiceprint of the called party from the database and determine whether the degree of fraud risk exceeds the threshold, and
when the degree of fraud risk exceeds the threshold, the notification unit is configured to notify at least one of a calling terminal of the calling party or a contact destination using terminal of the calling party that the called party is dangerous.

7. An anti-communications fraud method executed by an anti-communications fraud apparatus, the method comprising:
analyzing a voiceprint of a communication voice of a calling party;
acquiring, from a database in which the voiceprint and a degree of fraud risk are stored in association with each other, the degree of fraud risk corresponding to the voiceprint of the calling party, and determining whether the degree of fraud risk exceeds a threshold;
notifying, when the degree of fraud risk exceeds the threshold, that the calling party is dangerous;
receiving, from a called party, feedback information regarding the voiceprint of the calling party, wherein the feedback information indicates that the calling party is suspicious;
determining that a predetermined number of pieces of feedback information is received for the voiceprint of the calling party in a predetermined period of time; and
raising the degree of fraud risk of the voiceprint of the calling party.

8. A non-transitory computer readable medium storing one or more instructions causing a computer to operate as an anti-communications fraud apparatus to execute:
analyzing a voiceprint of a communication voice of a calling party;
acquiring, from a database in which the voiceprint and a degree of fraud risk are stored in association with each other, the degree of fraud risk corresponding to the voiceprint of the calling party, and determining whether the degree of fraud risk exceeds a threshold;
notifying, when the degree of fraud risk exceeds the threshold, that the calling party is dangerous;
receiving, from a called party, feedback information regarding the voiceprint of the calling party, wherein the feedback information indicates that the calling party is suspicious;
determining that a predetermined number of pieces of feedback information is received for the voiceprint of the calling party in a predetermined period of time; and
raising the degree of fraud risk of the voiceprint of the calling party.

9. The anti-communications fraud method according to claim 7, comprising:
after a call between the calling party and the called party ends, notifying at least one of a called terminal of the called party or a contact destination using terminal of the called party that the calling party is dangerous.

10. The anti-communications fraud method according to claim 7, comprising:

transmitting a warning sound to a called terminal of the called party during a call between the calling party and the called party.

11. The anti-communications fraud method according to claim 7, further comprising:
receiving the feedback information from a called terminal of the called party or a contact destination using terminal of the called party, and updating the degree of fraud risk of the voiceprint of the calling party of a call, the voiceprint being specified in the feedback information.

12. The anti-communications fraud method according to claim 11, comprising:
updating a score of the voiceprint of the calling party based on credibility of the called party who has transmitted the feedback information or a user of the contact destination using terminal.

13. The anti-communications fraud method according to claim 7, comprising:
analyzing a voiceprint of a communication voice of the called party;
acquiring a degree of fraud risk corresponding to the voiceprint of the called party from the database and determine whether the degree of fraud risk exceeds the threshold; and
when the degree of fraud risk exceeds the threshold, notifying at least one of a calling terminal of the calling party or a contact destination using terminal of the calling party that the called party is dangerous.

14. The non-transitory computer readable medium according to claim 8, wherein the one or more instructions cause the computer to execute:
after a call between the calling party and the called party ends, notifying at least one of a called terminal of the called party or a contact destination using terminal of the called party that the calling party is dangerous.

15. The non-transitory computer readable medium according to claim 8, wherein the one or more instructions cause the computer to execute:
transmitting a warning sound to a called terminal of the called party during a call between the calling party and the called party.

16. The non-transitory computer readable medium according to claim 8, wherein the one or more instructions cause the computer to execute:
receiving the feedback information from a called terminal of the called party or a contact destination using terminal of the called party, and updating the degree of fraud risk of the voiceprint of the calling party of a call, the voiceprint being specified in the feedback information.

17. The non-transitory computer readable medium according to claim 16, wherein the one or more instructions cause the computer to execute:
updating a score of the voiceprint of the calling party based on credibility of the called party who has transmitted the feedback information or a user of the contact destination using terminal.

18. The non-transitory computer readable medium according to claim 8, wherein the one or more instructions cause the computer to execute:
analyzing a voiceprint of a communication voice of the called party;
acquiring a degree of fraud risk corresponding to the voiceprint of the called party from the database and determine whether the degree of fraud risk exceeds the threshold; and
when the degree of fraud risk exceeds the threshold, notifying at least one of a calling terminal of the calling party or a contact destination using terminal of the calling party that the called party is dangerous.

* * * * *